United States Patent
Pan et al.

(10) Patent No.: US 8,282,096 B2
(45) Date of Patent: Oct. 9, 2012

(54) AUTOMATIC DOCUMENT FEEDER

(75) Inventors: Yung-Tai Pan, Taipei (TW); Chien-Kuo Kuan, Taipei (TW); Yi-Liang Chen, Taipei (TW); Ping-Hung Kuo, Taipei (TW)

(73) Assignee: Primax Electronics Ltd., Taipei (TW)

( * ) Notice: Subject to any disclaimer, the term of this patent is extended or adjusted under 35 U.S.C. 154(b) by 48 days.

(21) Appl. No.: 12/753,242

(22) Filed: Apr. 2, 2010

(65) Prior Publication Data

US 2011/0148025 A1    Jun. 23, 2011

(30) Foreign Application Priority Data

Dec. 18, 2009  (TW) .............................. 98143536 A (51) Int. Cl.
*B65H 7/02*   (2006.01)

(52) U.S. Cl. .................. 271/265.04; 271/262; 271/263; 250/559.27; 356/630

(58) Field of Classification Search ............. 271/265.04, 271/262, 263; 250/559.27; 356/630, 631
See application file for complete search history.

(56) References Cited

U.S. PATENT DOCUMENTS

| | | | | |
|---|---|---|---|---|
| 5,442,431 | A  * | 8/1995 | Fujimoto et al. | 399/367 |
| 6,459,492 | B1 * | 10/2002 | Hercher | 356/622 |
| 7,323,867 | B2 * | 1/2008 | Ueoka | 324/229 |
| 7,817,957 | B2 * | 10/2010 | Oohara et al. | 399/388 |

FOREIGN PATENT DOCUMENTS

| | | | | |
|---|---|---|---|---|
| JP | 57057150 | A | * | 4/1982 |
| JP | 02152843 | A | * | 6/1990 |

* cited by examiner

*Primary Examiner* — Luis A Gonzalez
(74) *Attorney, Agent, or Firm* — Kirton McConkie; Evan R. Witt (57) ABSTRACT

An automatic document feeder includes a transfer channel, a pick-up module and a thickness detecting module. The thickness detecting module includes a detecting member, a transmission member and an optical displacement sensing member. By the pick-up module, a sheet article is fed into the transfer channel. When the sheet article is transported across the detecting member, the sheet article is sustained against the detecting member, so that the detecting member is moved. The transmission member is connected to the detecting member. As the detecting member is moved, the transmission member generates a displacement amount. The optical displacement sensing member is used for detecting a displacement amount of the transmission member, thereby acquiring the thickness of the sheet article.

9 Claims, 8 Drawing Sheets

AUTOMATIC DOCUMENT FEEDER

FIELD OF THE INVENTION

The present invention relates to an automatic document feeder, and more particularly to an automatic document feeder with a thickness detecting module.

BACKGROUND OF THE INVENTION

In the early stage, a scanning apparatus is used to scan the image of a single document. After the document has been scanned, the document should be removed from the scanning apparatus and then a next document could be placed on the scanning apparatus in order to be further scanned. Since the process of manually replacing the document is very troublesome, the conventional scanning apparatus is not feasible to scan a stack of documents. Recently, an automatic document feeder is usually integrated into the scanning apparatus. After a stack of documents to be scanned are placed on the sheet input tray of the automatic document feeder, the automatic document feeder will successively transport the documents to perform a scanning operation without the need of manually replacing the documents. This means of automatically feeding the documents is both time-saving and efficient.

Figure 1:
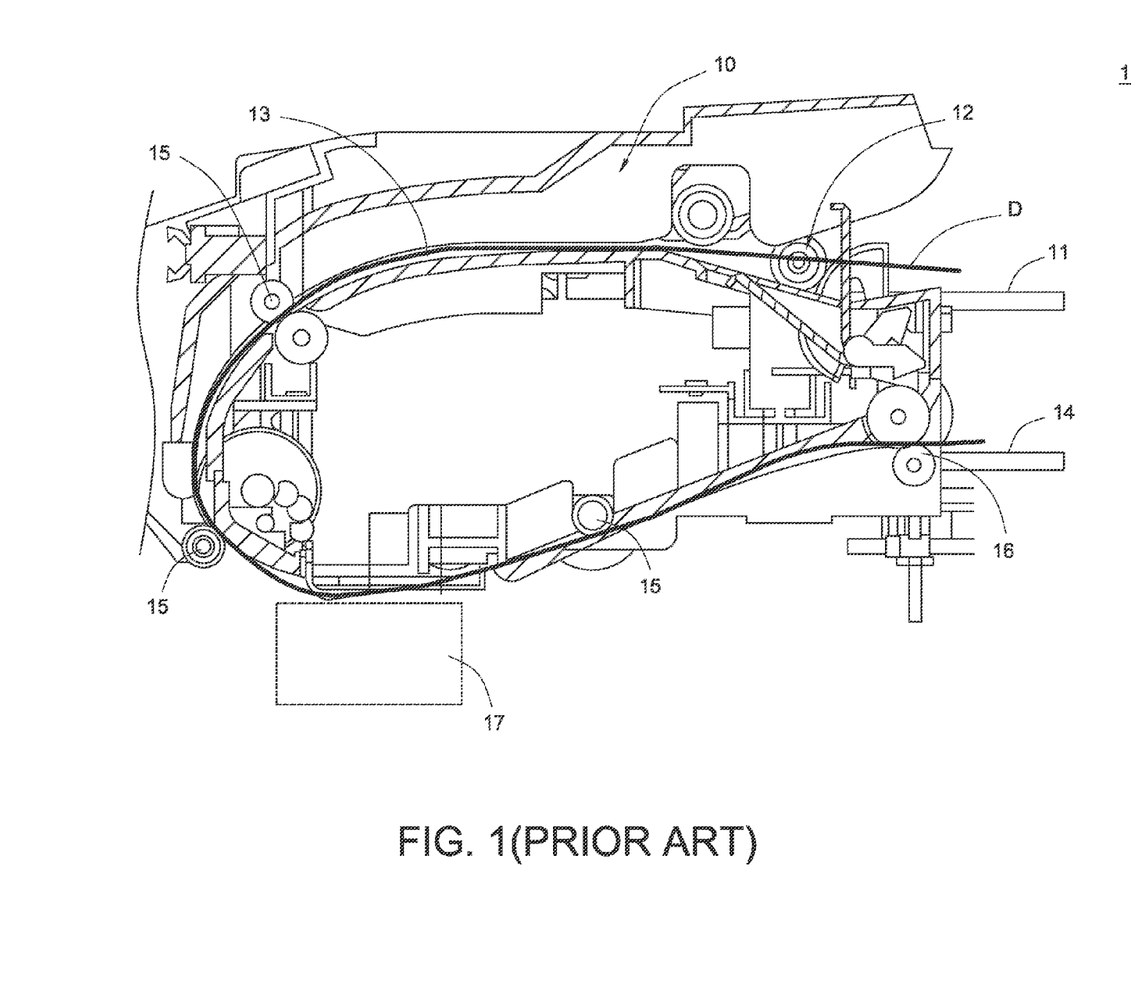
FIG. 1 is a schematic view illustrating a conventional automatic document feeder.

Hereinafter, the configurations and operating principles of a conventional automatic document feeder will be illustrated with reference to FIG. 1. FIG. 1 is a schematic view illustrating a conventional automatic document feeder. The conventional automatic document feeder 1 comprising a casing 10, a sheet input tray 11, a pick-up module 12, a transfer channel 13, a sheet ejecting tray 14, plural transfer roller assemblies 15 and an ejecting roller assembly 16. A scanning module 17 with a scanning function is disposed under the automatic document feeder 1. The document D to be scanned is placed on the sheet input tray 11. The pick-up module 12 is disposed in the vicinity of the sheet input tray 11 for feeding the document D into the transfer channel 13. The transfer roller assemblies 15 are arranged in the transfer channel 13 for transporting the document D through the transfer channel 13. After the document D is scanned, the scanned document D is ejected to the sheet ejecting tray 14 and supported on the sheet ejecting tray 14.

After the scanning operation is started, the document D placed on the sheet input tray 11 is fed into the transfer channel 13 by the pick-up module 12. After the document D is fed into the transfer channel 13, the document D is transported to a scan region above the scanning module 17 by the transfer roller assemblies 15, which is arranged in the transfer channel 13. Once the document D is transported across the scan region above the scanning module 17, the image of the document D is read out by the scanning module 17. The, the scanned document D is transported to the sheet ejecting tray 14 by the transfer roller assemblies 15 and the ejecting roller assembly 16. Meanwhile, the scanning operation of the document D is completed.

The conventional automatic document feeder 1, however, still has some drawbacks. For example, when a stack of documents D are fed by the automatic document feeder 1, a so-called double feeding or multi feeding problem occurs. Once the double feeding or multi feeding problem occurs, two or more documents are simultaneously fed into the transfer channel 13 to be scanned. Since two or more documents are partially or completely superimposed with each other when the double feeding or multi feeding problem occurs, missing pages are possibly generated. Moreover, if many documents are simultaneously fed into the transfer channel, the components within the automatic document feeder 1 are possibly abraded. In this situation, the use life thereof is shortened.

Therefore, there is a need of providing an improved automatic document feeder for avoiding the double feeding or multi feeding problem.

SUMMARY OF THE INVENTION

An object of the present invention provides an automatic document feeder with a thickness detecting module for detecting whether a multi feeding problem occurs.

In accordance with an aspect of the present invention, there is provided an automatic document feeder for feeding a sheet article. The automatic document feeder includes a transfer channel, a pick-up module and a thickness detecting module. The pick-up module is used for feeding the sheet article into the transfer channel. The thickness detecting module is used for detecting the sheet article that is fed into the transfer channel. The thickness detecting module includes a detecting member, a transmission member and an optical displacement sensing member. The detecting member is disposed in the transfer channel to be in contact with the sheet article. When the sheet article is transported across the detecting member, the sheet article is sustained against the detecting member, so that the detecting member is moved from a first position to a second position. The transmission member is connected with the detecting member. As the detecting member is moved from the first position to the second position, the transmission member is moved from a third position to a fourth position. The optical displacement sensing member is disposed beside the transmission member for detecting a displacement amount of the transmission member, thereby acquiring the thickness of the sheet article.

In an embodiment, the thickness detecting module is disposed within a module housing.

In an embodiment, the transmission member includes a fixing shaft and a swinging arm. The fixing shaft is fixed on the module housing. The swinging arm has a detecting surface and is swung with respect to the module housing. The detecting member includes a rolling structure and a linking rod. The rolling structure is in contact with the sheet article for facilitating feeding the sheet article when the sheet article is transported across the rolling structure. The linking rod is connected to the rolling structure and the swinging arm. When the sheet article is sustained against the rolling structure and the rolling structure is moved from the first position to the second position, the linking rod and the rolling structure are synchronously moved and the swinging arm is swung from the third position to the fourth position in response to movement of the linking rod. As such, a displacement amount of the detecting surface of the swinging arm is detectable by the optical displacement sensing member and the thickness of the sheet article is acquired.

In an embodiment, the thickness detecting module further includes a resilient element. An end of the resilient element is connected to the linking rod. The other end of the resilient element is connected to the module housing. After the sheet article is departed from the rolling structure and not sustained against the rolling structure, an elastic force provided by the resilient element allows the rolling structure to be returned from the second position to the first position.

In an embodiment, the transmission member includes a transmission arm, a fixing shaft, a shifting part and a steering roller. The fixing shaft is fixed on the module housing such that the transmission arm is swung with respect to the module housing. The shifting part is connected to the transmission arm via a rope. The shifting part is movable with the detecting member, and has a detecting surface. The steering roller is disposed on the module housing and contacted with the rope for changing a direction of the rope. The detecting member includes a rolling structure and a linking rod. When the sheet article is transported across the rolling structure, the rolling structure is in contact with the sheet article for facilitating feeding the sheet article. The linking rod is connected to the rolling structure. When the sheet article is sustained against the rolling structure and the rolling structure is moved from the first position to the second position, the linking rod and the rolling structure are synchronously moved, the transmission arm connected to the linking rod is swung to pull the rope in response to movement of the linking rod, and the shifting part connected to the rope is moved from the third position to the fourth position. As such, a displacement amount of the detecting surface of the shifting part is detectable by the optical displacement sensing member and the thickness of the sheet article is acquired.

In an embodiment, the thickness detecting module further includes a resilient element. An end of the resilient element is connected to the shifting part. The other end of the resilient element is connected to the module housing. After the sheet article is departed from the rolling structure and not sustained against the rolling structure, an elastic force provided by the resilient element allows the rolling structure to be returned from the second position to the first position.

In an embodiment, the transmission member includes a double layer gear set and a shifting part. The double layer gear set includes a first-layered gear and a second-layered gear. The shifting part includes a transmission rack and a detecting surface. The transmission rack is engaged with the second-layered gear, so that the shifting part is moved upon rotation of the double layer gear set. When the sheet article is transported across the rolling structure, the detecting member includes a rolling structure and a linking rod. The rolling structure is in contact with the sheet article for facilitating feeding the sheet article. The linking rod is connected to the rolling structure, and has a detecting rack. The detecting rack is engaged with the first-layered gear such that the double layer gear set is rotated in response to movement of the linking rod. When the sheet article is sustained against the rolling structure and the rolling structure is moved from the first position to the second position, the linking rod and the rolling structure are synchronously moved, the first-layered gear engaged with the detecting rack is rotated in response to movement of the linking rod, the double layer gear set is rotated with the first-layered gear, and the shifting part is moved from the third position to the fourth position upon rotation of the double layer gear set. As such, a displacement amount of the detecting surface of the shifting part is detectable by the optical displacement sensing member and the thickness of the sheet article is acquired.

In an embodiment, the thickness detecting module further includes a resilient element. An end of the resilient element is connected to the shifting part. The other end of the resilient element is connected to the module housing. After the sheet article is departed from the rolling structure and not sustained against the rolling structure, an elastic force provided by the resilient element allows the rolling structure to be returned from the second position to the first position.

In an embodiment, the automatic document feeder further includes a casing. The transmission member includes a swinging rod and a shifting part. The swinging rod has a first end fixed on the casing. The shifting part is connected to a second end of the swinging rod. The shifting part is movable with the detecting member, and has a detecting surface. The detecting member includes a rolling structure and a linking rod. When the sheet article is transported across the rolling structure, the rolling structure is in contact with the sheet article for facilitating feeding the sheet article. The linking rod is connected to the rolling structure and the swinging rod. When the sheet article is sustained against the rolling structure and the rolling structure is moved from the first position to the second position, the linking rod and the rolling structure are synchronously moved, and the shifting part connected to the swinging rod is moved from the third position to the fourth position. As such, a displacement amount of the detecting surface of the shifting part is detectable by the optical displacement sensing member and the thickness of the sheet article is acquired.

In an embodiment, the optical displacement sensing member is disposed beside the transfer channel.

In an embodiment, the thickness detecting module further includes a resilient element. An end of the resilient element is connected to the swinging rod. The other end of the resilient element is connected to the casing. After the sheet article is departed from the rolling structure and not sustained against the rolling structure, an elastic force provided by the resilient element allows the rolling structure to be returned from the second position to the first position.

In an embodiment, the optical displacement sensing member includes a circuit board, a light source, an optical assembly, a sensor and a control unit. The light source is disposed on the circuit board for emitting light beams. The optical assembly is used for guiding the light beams to be projected on the transmission member. The sensor is disposed on the circuit board for receiving the light beams reflected from the transmission member and generating corresponding image signals according to the reflected light beams. A first image signal is obtained by the sensor when the transmission member is located in a third position. A second image signal is obtained by the sensor when the transmission member is located in a fourth position. The control unit is disposed on the circuit board for calculating the displacement amount between the first position and the second position according to the first image signal and the second image signal.

In an embodiment, the optical assembly includes a first optical lens and a second optical lens. The first optical lens is arranged in front of the light source for focusing the light beams emitted by the light source and projecting the focused light beams on the transmission member. The second optical lens is used for receiving the light beams reflected from the transmission member and focusing the light beams.

In an embodiment, the optical assembly further includes a reflective mirror set for changing the direction of the light beams, so that the light beams are projected on the transmission member.

In an embodiment, the reflective mirror set includes a first reflective mirror and a second reflective mirror. The light beams emitted by the light source pass through the first optical lens, are reflected from the first reflective mirror and the second reflective mirror, and are projected on the surface of the detecting arm. The light beams reflected from the transmission member pass through the second optical lens and is projected on the sensor to be received by the sensor.

In an embodiment, the first optical lens and the second optical lens are convex lenses.

In an embodiment, the first optical lens, the second optical lens, the first reflective mirror and the second reflective mirror of the optical assembly are integrally formed.

In an embodiment, the light source is a light emitting diode (LED) or a laser diode.

In an embodiment, the control unit is a digital signal processor (DSP).

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 2A:
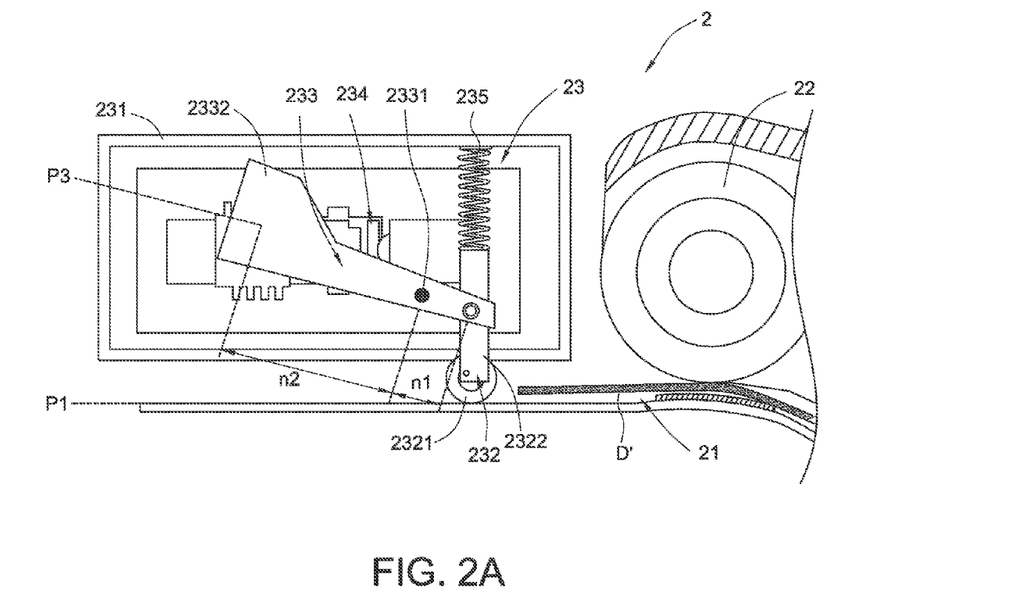
FIGS. 2A and 2B are schematic side views illustrating a portion of an automatic document feeder according to a first embodiment of the present invention.
Figure 2B:
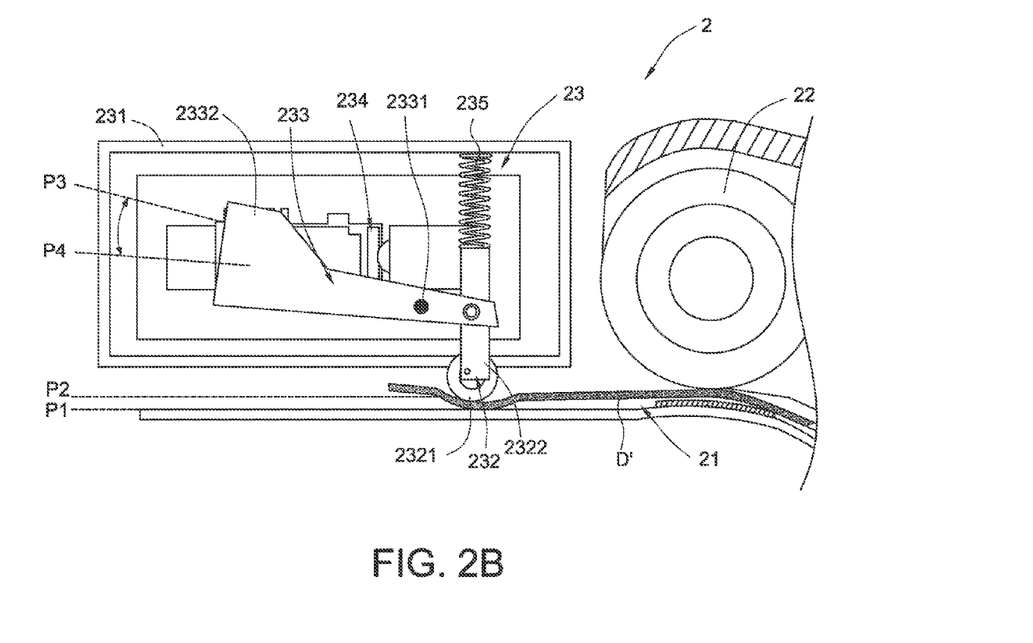

FIGS. 2A and 2B are schematic side views illustrating a portion of an automatic document feeder according to a first embodiment of the present invention. The automatic document feeder 2 is used for feeding a sheet article D'. As shown in FIGS. 2A and 2B, the automatic document feeder 2 comprises a transfer channel 21, a pick-up module 22 and a thickness detecting module 23. The transfer channel 21 is used for leading the sheet article D' to pass therethrough. The pick-up module 22 is used for feeding the sheet article D' into the transfer channel 21. The thickness detecting module 23 is disposed behind the pick-up module 22, and arranged above the transfer channel 21 for detecting a thickness of the sheet article D' that is fed into the transfer channel 21. The thickness detecting module 23 comprises a module housing 231, a detecting member 232, a transmission member 233, an optical displacement sensing member 234 and a resilient element 235.

The detecting member 232 is disposed in the transfer channel 21 to be in contact with the sheet article D'. The transmission member 233 is connected with the detecting member 232. As such, the transmission member 233 is moved in response to movement of the detecting member 232. The optical displacement sensing member 234 is disposed beside the transmission member 233 for detecting the displacement amount of the transmission member 233, thereby acquiring the thickness of the sheet article D'. The resilient element 235 is connected with the module housing 231 for providing an elastic force. An example of the resilient element 235 is a spring.

In this embodiment, the transmission member 233 comprises a fixing shaft 2333 and a swinging arm 2332. The fixing shaft 2333 is fixed on the module housing 231. The swinging arm 2332 has a detecting surface (see FIG. 3). The swinging arm 2332 may be swung with respect to the module housing 231. The detecting member 232 comprises a rolling structure 2321 and a linking rod 2322. When the sheet article D' is transported across the rolling structure 2321, the rolling structure 2321 is in contact with the sheet article D' for facilitating feeding the sheet article D'. In this embodiment, the rolling structure 2321 is a roller. Alternatively, the rolling structure 2321 may be a movable slant or an arc-shaped surface. The linking rod 2322 is connected to the rolling structure 2321 and an end of the resilient element 235. The other components of the automatic document feeder 2 are similar to those of the conventional automatic document feeder, and are not redundantly described herein.

Figure 3:
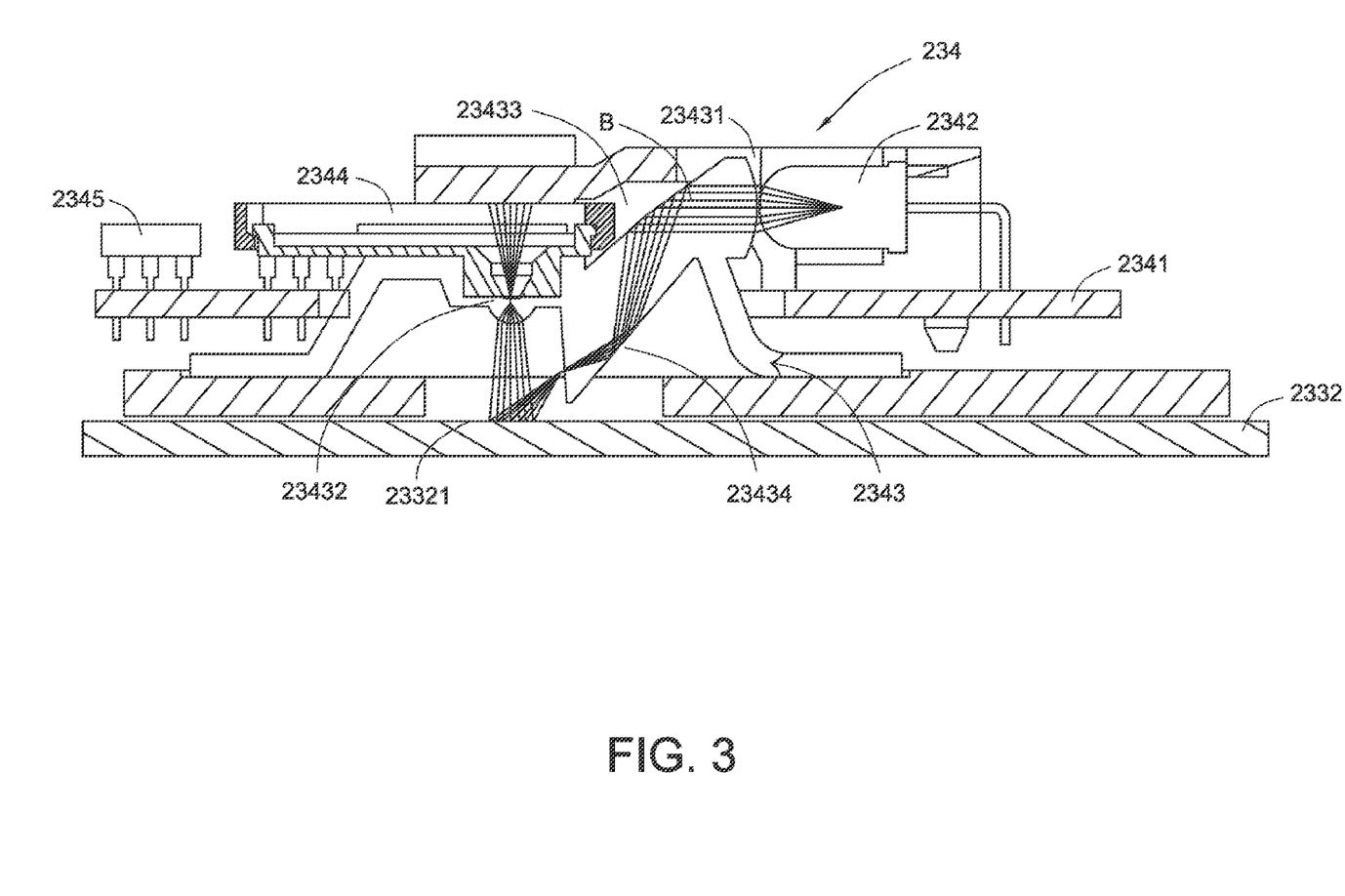
FIG. 3 is a schematic side view illustrating the optical displacement sensing element used in the automatic document feeder according to the first embodiment of the present invention.

The detailed configurations of the optical displacement sensing member 234 will be illustrated with reference to FIG. 3. FIG. 3 is a schematic side view illustrating the optical displacement sensing member used in the automatic document feeder according to the first embodiment of the present invention. The optical displacement sensing member 234 comprises a circuit board 2341, a light source 2342, an optical assembly 2343, a sensor 2344 and a control unit 2345. The light source 2342 is disposed on the circuit board 2341 for emitting light beams B. An example of the light source 2342 includes but is not limited to a light emitting diode (LED) or a laser diode. The optical assembly 2343 is used for guiding the light beams B and focusing the light beams B. The sensor 2344 is also disposed on the circuit board 2341 for receiving the light beams B, thereby generating corresponding image signals. The control unit 2345 is also disposed on the circuit board 2341 for analyzing the image signals, thereby computing the displacement amount of the transmission member 233. An example of the control unit 2345 includes but is not limited to a digital signal processor (DSP).

Please refer to FIG. 3. The optical assembly 2343 of the optical displacement sensing member 234 comprises a first optical lens 23431, a second optical lens 23432 and a reflective mirror set. The first optical lens 23431 is arranged in front of the light source 2342. The first optical lens 23431 and the second optical lens 23432 are used for focusing the light beams B. In this embodiment, the first optical lens 23431 and the second optical lens 23432 are convex lenses. The reflective mirror set is used for changing the direction of the light beams B. In this embodiment, the reflective mirror set comprises a first reflective mirror 23433 and a second reflective mirror 23434. It is preferred that the first optical lens 23431, the second optical lens 23432, the first reflective mirror 23433 and the second reflective mirror 23434 of the optical assembly 2343 are integrally formed.

Please refer to FIGS. 2A and 3. In a case that the sheet article D' has not been transported to the thickness detecting module 23, the rolling structure 2321 is in contact with the transfer channel 21, the rolling structure 2321 is located in a first position P1, and the swinging arm 2332 is located in a third position P3. Meanwhile, the light beams B emitted by the light source 2342 of the optical displacement sensing member 234 are focused by the first optical lens 23431 while passing through the first optical lens 23431. The focused light beams B are successively reflected from the first reflective mirror 23433 and the second reflective mirror 23434. The reflected light beams B are projected on the detecting surface 23321 of the swinging arm 2332. The light beams B reflected from the detecting surface 23321 of the swinging arm 2332 are focused by the second optical lens 23432 while passing through the second optical lens 23432. Afterwards, the light beams B reflected from the detecting surface 23321 and focused by the second optical lens 23432 are received by the sensor 2344, so that a first image signal is generated. The first image signal includes the image of the detecting surface 23321 of the swinging arm 2332 when the swinging arm 2332 is located in the third position P3.

When the sheet article D' is fed by the pick-up module 22 and transported across the thickness detecting module 23, the rolling structure 2321 is in contact with the sheet article D' and the sheet article D' is sustained against the rolling structure 2321, so that the rolling structure 2321 is moved from a first position P1 to a second position P2. Since the linking rod 2322 is connected with the rolling structure 2321, the linking rod 2322 is synchronously moved with the rolling structure 2321. In response to movement of the linking rod 2322, the swinging arm 2332 is swung from a third position P3 to a fourth position P4 (see FIG. 2B). When the swinging arm 2332 is in the fourth position P4, the detecting surface 23321 of the swinging arm 2332 is detected optical displacement sensing member 234, so that a second image signal is generated. The second image signal includes the image of the detecting surface 23321 of the swinging arm 2332 when the swinging arm 2332 is located in the fourth position P4. Then, the first image signal and the second image signal are transmitted to the control unit 2345. By analyzing and comparing the first image signal and the second image signal, the control unit 2345 calculates the distance between the third position P3 and the fourth position P4. According to the distance between the third position P3 and the fourth position P4, the displacement amount of the swinging arm 2332 is realized, and thus the thickness of the sheet article D' is obtained. After the sheet article D' is departed from the thickness detecting module 23, the sheet article D' is no longer sustained against the rolling structure 2321. Meanwhile, due to the elastic force offered by the resilient element 235, the swinging arm 2332 is returned from the fourth position P4 to the third position P3, and the rolling structure 2321 is returned from the second position P2 to the first position P1.

Please refer to FIGS. 2A and 2B again. The length from the linking rod 2322 to the fixing shaft 2333 of the swinging arm 2332 is n1, and the length from the fixing shaft 2333 to the detecting surface 23321 of the swinging arm 2332 is n2. Due to the transmission member 233, the displacement amount of the rolling structure 2321 from the first position P1 to the second position P2 will be multiplied by a magnification factor (n2/n1) according to the geometric relation between the lengths n1 and n2. In other words, the displacement amount of the swinging arm 2332 of the thickness detecting module 23 from the third position P3 to the fourth position P4 is not equal to the displacement amount of the rolling structure 2321 from the first position P1 to the second position P2. After the displacement amount from the third position P3 to the fourth position P4 is divided by the magnification factor (n2/n1), the actual displacement amount from the first position P1 to the second position P2 (i.e. the thickness of the sheet article D') is obtained.

Figure 4:
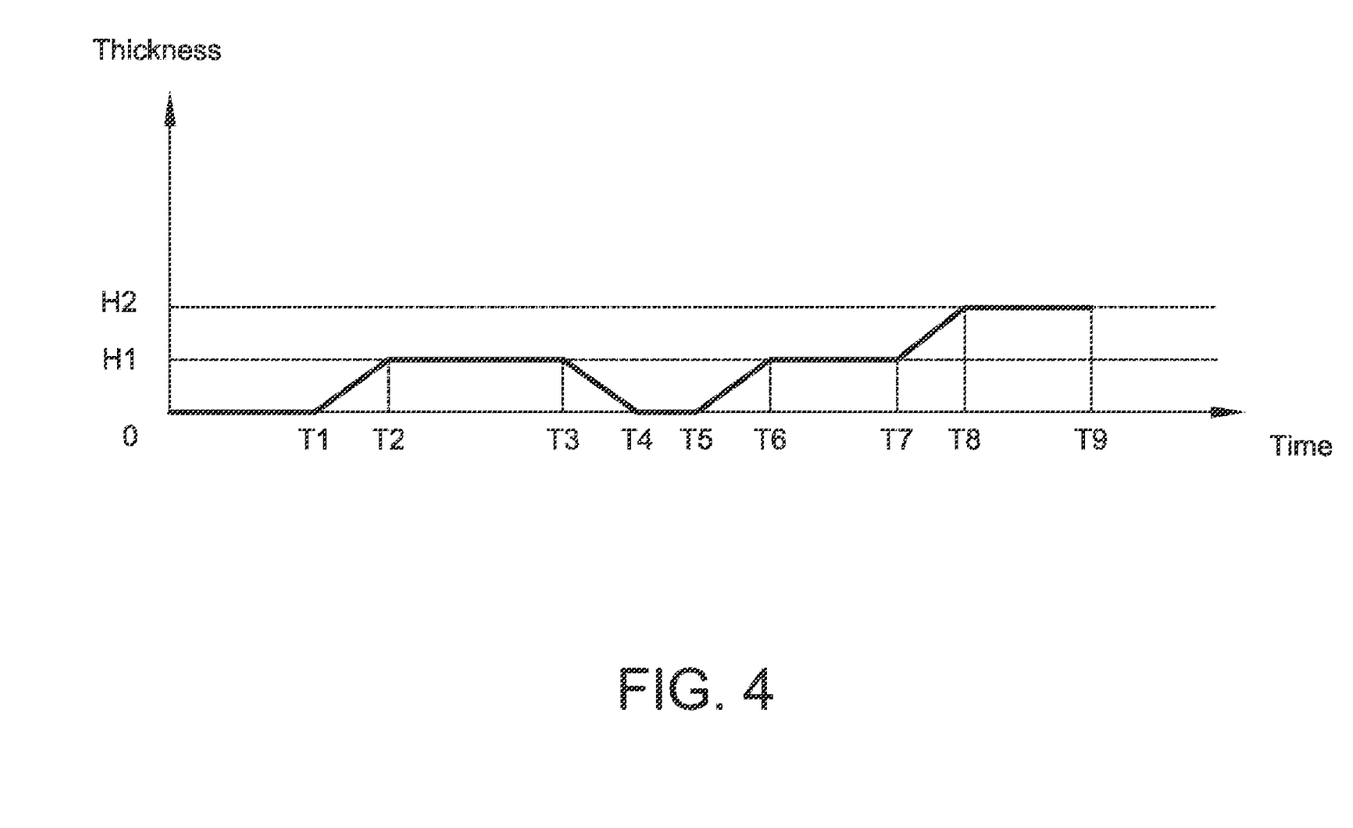
FIG. 4 is a schematic thickness-time plot illustrating the thickness of the document detected by the thickness detecting module according to the first embodiment of the present invention.

Hereinafter, a process of detecting a stack of documents by the thickness detecting module 23 will be illustrated with reference to FIG. 4. FIG. 4 is a schematic thickness-time plot illustrating the thickness of the document detected by the thickness detecting module according to the first embodiment of the present invention. In FIG. 4, the horizontal axle indicates time, and the vertical axle indicates thickness.

Since the thickness is zero from the time spot 0 to the time spot T1, it is meant that the first document has not been transported to the thickness detecting module 23 and not detected by the thickness detecting module 23. From the time spot T1 to the time spot T2, the thickness is gradually increased. That is, the front end of the first document is transported across and detected by the thickness detecting module 23 from the time spot T1 to the time spot T2. From the time spot T2 to the time spot T3, the first document is completely detected by the thickness detecting module 23, wherein the first document has a thickness H1. From the time spot T3 to the time spot T4, the thickness is gradually decreased from H1 to zero. That is, the rear end of the first document is transported across and detected by the thickness detecting module 23, and is about to depart from the thickness detecting module 23. Since the thickness is zero from the time spot T4 to the time spot T5, it is meant that the first document has been departed from the thickness detecting module 23 and the next document has not been detected by the thickness detecting module 23.

Since the thickness is gradually increased from the time spot T5 to the time spot T6, it is meant that a second document is transported across and detected by the thickness detecting module 23. From the time spot T6 to the time spot T7, the thickness H1 of the second document is detected by the thickness detecting module 23. That is, the thickness of the second document is the same as that of the first document. The control unit 2345 may judge that the second document and the first document are the same type documents. Since the thickness is gradually increased from the time spot T7 to the time spot T8, it is meant that a third document is transported across and detected by the thickness detecting module 23. From the time spot T8 to the time spot T9, the thickness H2 of the third document is detected by the thickness detecting module 23. Since the thickness H2 is much greater than the thickness H1, the control unit 2345 may judge that a double feeding problem occurs. Meanwhile, the control unit 2345 issues a prompt signal in order to perform the further processing process. By subtracting the thickness H1 from the thickness H2, the control unit 2345 may acquire the thickness (H2−H1) of the third document. If the thickness (H2−H1) is equal to the thickness H1, the third document and the first document are the same type documents.

Figure 5A:
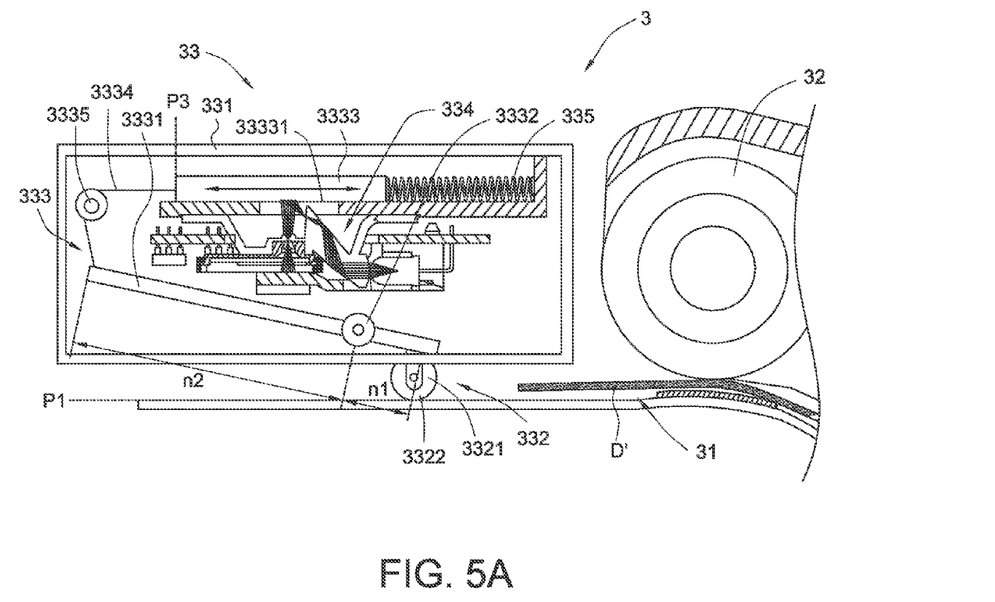
FIGS. 5A and 5B are schematic side views illustrating a portion of an automatic document feeder according to a second embodiment of the present invention.
Figure 5B:
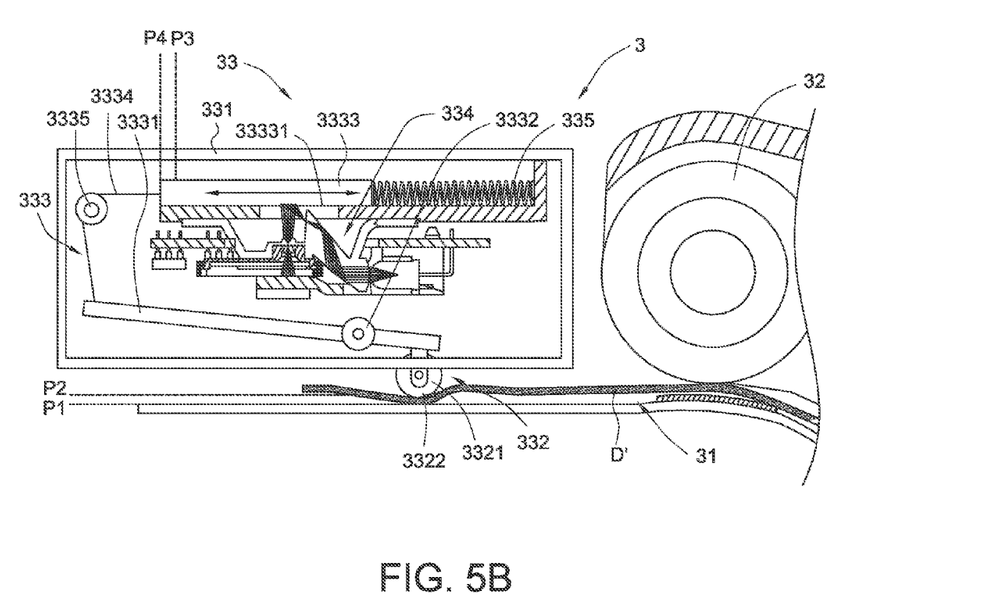

FIGS. 5A and 5B are schematic side views illustrating a portion of an automatic document feeder according to a second embodiment of the present invention. As shown in FIGS. 5A and 5B, the automatic document feeder 3 comprises a transfer channel 31, a pick-up module 32 and a thickness detecting module 33. The pick-up module 32 is used for feeding the sheet article D' into the transfer channel 31. The thickness detecting module 33 is disposed behind the pick-up module 32, and arranged above the transfer channel 31 for detecting a thickness of the sheet article D' that is fed into the transfer channel 31. The thickness detecting module 33 comprises a module housing 331, a detecting member 332, a transmission member 333, an optical displacement sensing member 334 and a resilient element 335.

The detecting member 332 is disposed in the transfer channel 31 to be in contact with the sheet article D'. The transmission member 333 is connected with the detecting member 332. As such, the transmission member 333 is moved as the detecting member 332 is moved. The optical displacement sensing member 334 is disposed beside the transmission member 333 for detecting the displacement amount of the transmission member 333, thereby acquiring the thickness of the sheet article D'. The resilient element 335 is connected with the module housing 331 for providing an elastic force.

In this embodiment, the transmission member 333 comprises a transmission arm 3331, a fixing shaft 3332, a shifting part 3333, a rope 3334 and a steering roller 3335. The fixing shaft 3332 is fixed on the module housing 331. The transmission arm 3331 may be swung with respect to the module housing 231. The shifting part 3333 is connected to the transmission arm 3331 through the rope 3334. As such, the shifting part 3333 is moved with the detecting member 332. The shifting part 3333 has a detecting surface 33331. The steering roller 3335 is disposed on the module housing 331. The steering roller 3335 is in contact with the rope 3334 for changing the direction of the rope 3334. The detecting member 332 comprises a rolling structure 3321 and a linking rod 3322. When the sheet article D' is transported across the rolling structure 3321, the rolling structure 3321 is in contact with the sheet article D' for facilitating feeding the sheet article D'. The linking rod 3322 is connected to the rolling structure 3321 and an end of the resilient element 335. The configurations and operating principles of the optical displacement sensing member 334 are identical to that shown in the first embodiment, and are not redundantly described herein.

When the sheet article D' is fed by the pick-up module 32 and transported across the thickness detecting module 33, the rolling structure 3321 is in contact with the sheet article D' and the sheet article D' is sustained against the rolling structure 3321, so that the rolling structure 3321 is moved from a first position P1 to a second position P2. Since the linking rod 3322 is connected with the rolling structure 3321, the linking rod 3322 is synchronously moved with the rolling structure 3321. In response to movement of the linking rod 3322, the transmission arm 3331 connected to the linking rod 3322 is swung to pull the rope 3334. Since the shifting part 3333 is connected to the rope 3334, the shifting part 3333 is pulled and moved from a third position P3 to a fourth position P4. By detecting the displacement amount of the detecting surface 33331 of the shifting part 3333, the optical displacement sensing member 334 can acquire the thickness of the sheet article D'. After the sheet article D' is departed from the thickness detecting module 33, the sheet article D' is no longer sustained against the rolling structure 3321. Due to the elastic force offered by the resilient element 335, the shifting part 3333 is returned from the fourth position P4 to the third position P3, and the rolling structure 3321 is returned from the second position P2 to the first position P1. Meanwhile, the thickness detecting process is completed.

Please refer to FIGS. 5A and 5B again. The length from the linking rod 3322 to the fixing shaft 3332 of the transmission arm 3331 is n1, and the length from the fixing shaft 3332 to the detecting surface 33331 of the transmission arm 3331 is n2. Due to the transmission member 333, the displacement amount of the rolling structure 3321 from the first position P1 to the second position P2 will be multiplied by a magnification factor (n2/n1) according to the geometric relation between the lengths n1 and n2. In other words, after the displacement amount from the third position P3 to the fourth position P4 is divided by the magnification factor (n2/n1), the actual displacement amount from the first position P1 to the second position P2 (i.e. the thickness of the sheet article D') is obtained.

Figure 6A:
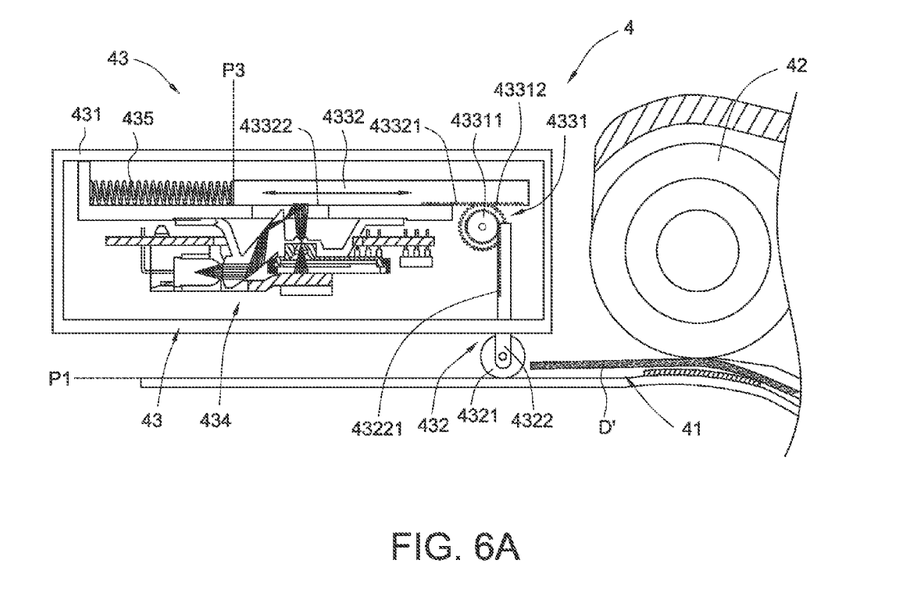
FIGS. 6A and 6B are schematic side views illustrating a portion of an automatic document feeder according to a third embodiment of the present invention.
Figure 6B:
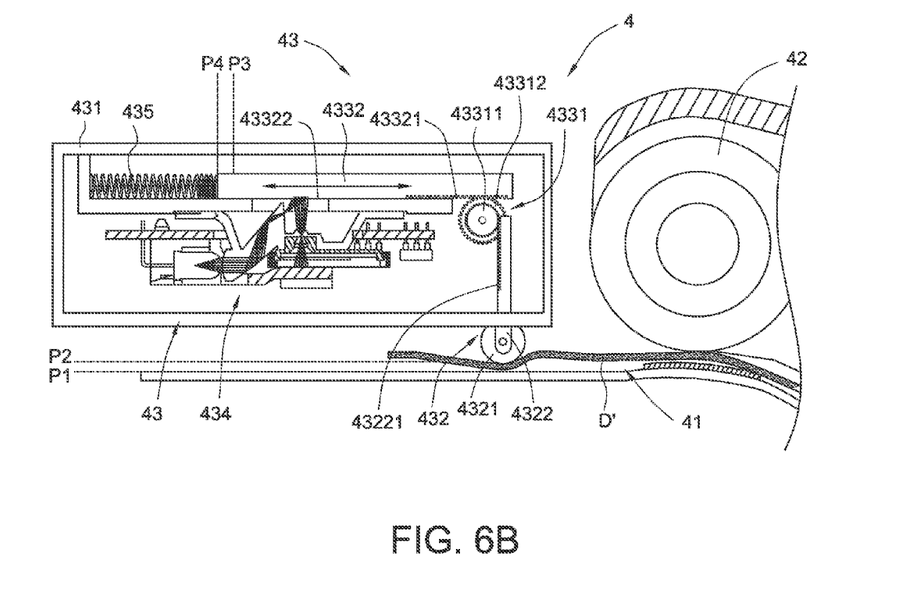

FIGS. 6A and 6B are schematic side views illustrating a portion of an automatic document feeder according to a third embodiment of the present invention. As shown in FIGS. 6A and 6B, the automatic document feeder 4 comprises a transfer channel 41, a pick-up module 42 and a thickness detecting module 43. The pick-up module 42 is used for feeding the sheet article D' into the transfer channel 41. The thickness detecting module 43 is disposed behind the pick-up module 42, and arranged above the transfer channel 41 for detecting a thickness of the sheet article D' that is fed into the transfer channel 41. The thickness detecting module 43 comprises a module housing 431, a detecting member 432, a transmission member 433, an optical displacement sensing member 434 and a resilient element 435. The detecting member 432 is disposed in the transfer channel 41 to be in contact with the sheet article D'. The transmission member 433 is connected with the detecting member 432. As such, the transmission member 433 is moved as the detecting member 432 is moved. The optical displacement sensing member 434 is disposed beside the transmission member 433 for detecting the displacement amount of the transmission member 433, thereby acquiring the thickness of the sheet article D'. The resilient element 435 is connected with the module housing 431 for providing an elastic force.

In this embodiment, the transmission member 433 comprises a double layer gear set 4331 and a shifting part 4332. The double layer gear set 4331 comprises a first-layered gear 43311 and a second-layered gear 43312. The shifting part 4332 comprises a transmission rack 43321 and a detecting surface 43322. The transmission rack 43321 is engaged with the second-layered gear 43312. As such, the shifting part 4332 is moved as the double layer gear set 4331 is rotated. The detecting member 432 comprises a rolling structure 4321 and a linking rod 4322. When the sheet article D' is transported across the rolling structure 4321, the rolling structure 4321 is in contact with the sheet article D' for facilitating feeding the sheet article D'. The linking rod 4322 is connected to the rolling structure 4321 and an end of the resilient element 435. The linking rod 4322 has a detecting rack 43221. The detecting rack 43221 is engaged with the first-layered gear 43311. As such, the double layer gear set 4331 is rotated as the linking rod 4322 is moved. The configurations and operating principles of the optical displacement sensing member 434 are identical to that shown in the first embodiment, and are not redundantly described herein.

When the sheet article D' is fed by the pick-up module 42 and transported across the thickness detecting module 43, the rolling structure 4321 is in contact with the sheet article D' and the sheet article D' is sustained against the rolling structure 4321, so that the rolling structure 4321 is moved from a first position P1 to a second position P2. Since the linking rod 4322 is connected with the rolling structure 4321, the linking rod 4322 is synchronously moved with the rolling structure 4321. Since the detecting rack 43221 is engaged with the first-layered gear 43311, the double layer gear set 4331 is rotated in response to movement of the linking rod 4322. Upon rotation of the double layer gear set 4331, the shifting part 4332 is moved from a third position P3 to a fourth position P4. By detecting the displacement amount of the detecting surface detecting surface 43322 of the shifting part 4332, the optical displacement sensing member 434 can acquire the thickness of the sheet article D'. After the sheet article D' is departed from the thickness detecting module 43, the sheet article D' is no longer sustained against the rolling structure 4321. Due to the elastic force offered by the resilient element 435, the shifting part 4332 is returned from the fourth position P4 to the third position P3, and the rolling structure 4321 is returned from the second position P2 to the first position P1. Meanwhile, the thickness detecting process is completed.

Please refer to FIGS. 6A and 6B again. In the double layer gear set 4331, the first-layered gear 43311 has a teeth number r1, and the second-layered gear 43312 has a teeth number r2. Due to the transmission member 433, the displacement amount of the rolling structure 4321 from the first position P1 to the second position P2 will be multiplied by a magnification factor (r2/r1) according to the relation between the teeth numbers r1 and r2. In other words, after the displacement amount from the third position P3 to the fourth position P4 is divided by the magnification factor (r2/r1), the actual displacement amount from the first position P1 to the second position P2 (i.e. the thickness of the sheet article D') is obtained.

Figure 7:
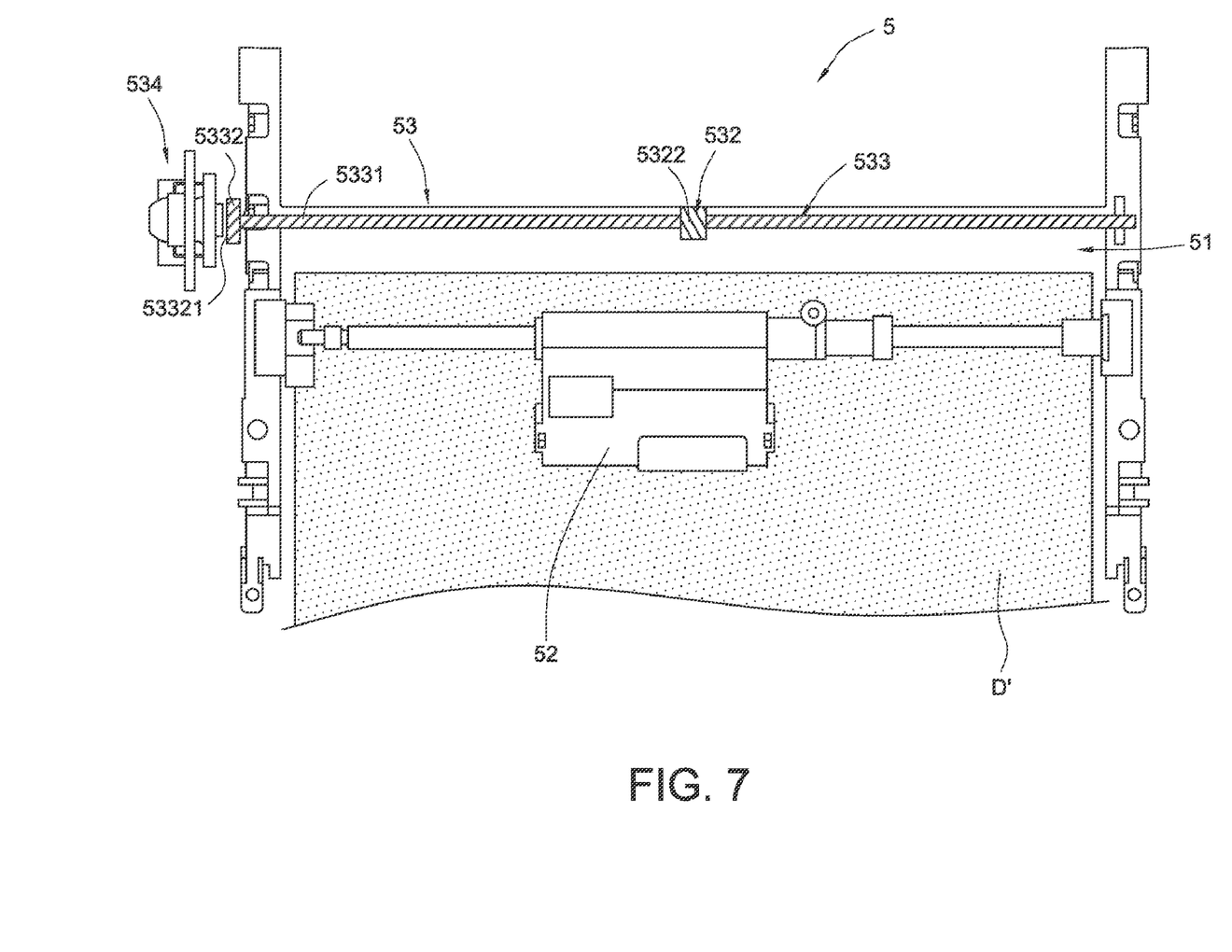
FIG. 7 is a schematic top view illustrating a portion of an automatic document feeder according to a fourth embodiment of the present invention.

FIG. 7 is a schematic top view illustrating a portion of an automatic document feeder according to a fourth embodiment of the present invention. The automatic document feeder 5 comprising a casing 50, a transfer channel 51, a pick-up module 52 and a thickness detecting module 53. The pick-up module 52 is used for feeding the sheet article D' into the transfer channel 51. The thickness detecting module 53 is disposed behind the pick-up module 52 for detecting a thickness of the sheet article D' that is fed into the transfer channel 51. The thickness detecting module 53 comprises a detecting member 532, a transmission member 533, an optical displacement sensing member 534 and a resilient element 535 (see FIG. 8A). The detecting member 532 is disposed in the transfer channel 51 to be in contact with the sheet article D'. The transmission member 533 is connected with the detecting member 532. As such, the transmission member 533 is moved as the detecting member 532 is moved. The optical displacement sensing member 534 is disposed beside the transfer channel 51 for detecting the displacement amount of the transmission member 533, thereby acquiring the thickness of the sheet article D'. The resilient element 535 is connected with the casing 50 for providing an elastic force (see FIG. 8A).

Figure 8A:
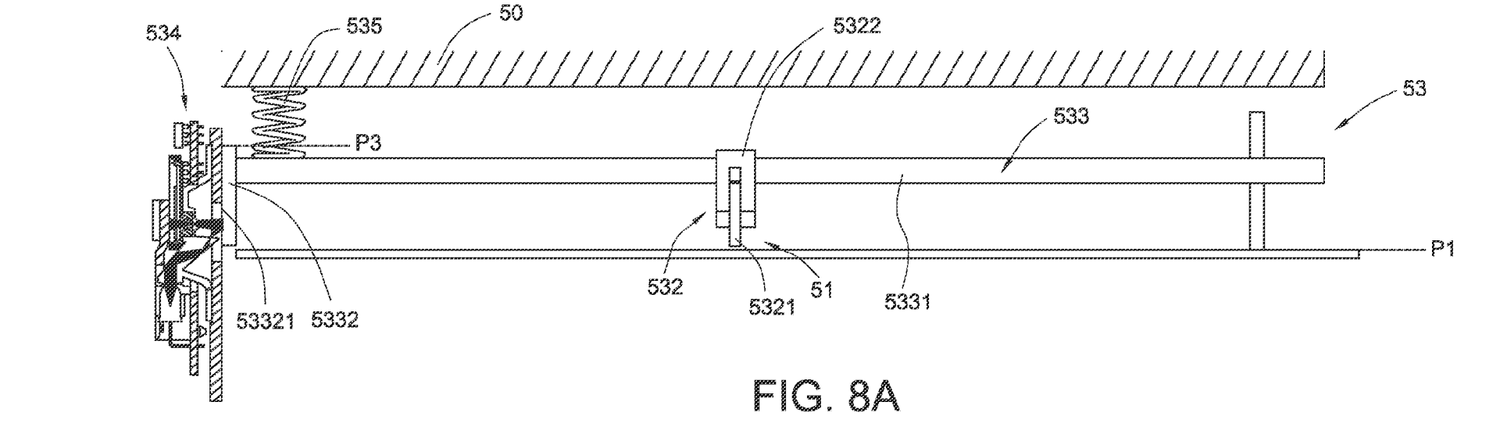
FIGS. 8A and 8B are schematic side views illustrating a portion of an automatic document feeder according to the fourth embodiment of the present invention.
Figure 8B:
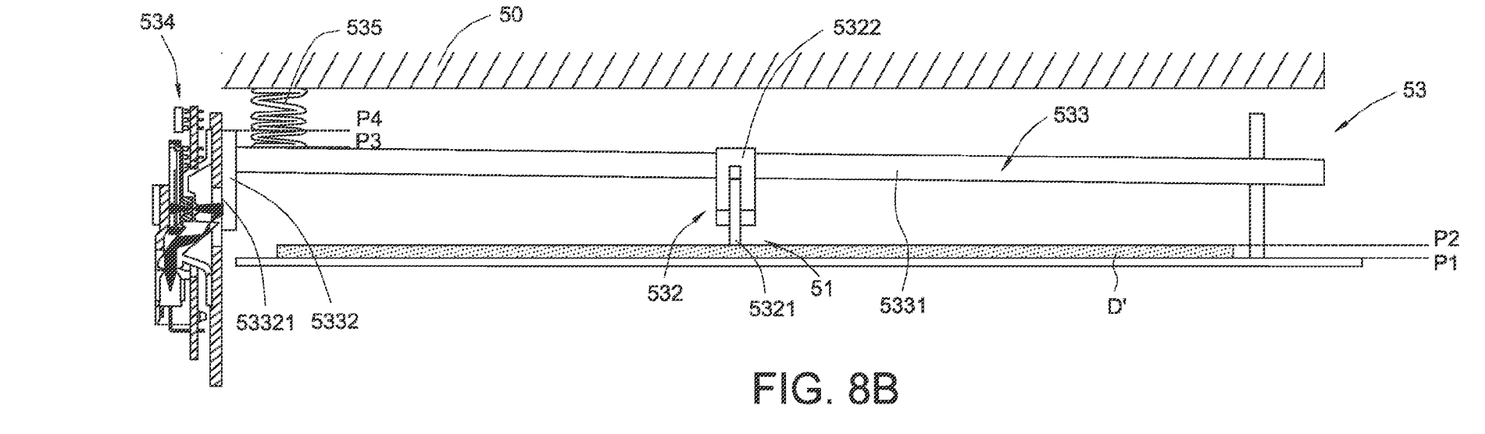

FIGS. 8A and 8B are schematic side views illustrating a portion of an automatic document feeder according to the fourth embodiment of the present invention. In this embodiment, the transmission member 533 comprises a swinging rod 5331 and a shifting part 5332. A first end of the swinging rod 5331 is fixed on the casing 50. The shifting part 5332 is connected to a second end of the swinging rod 5331. As such, the shifting part 5332 is moved as the detecting member 532 is moved. The shifting part 5332 has a detecting surface 53321. The detecting member 532 comprises a rolling structure 5321 and a linking rod 5322. When the sheet article D' is transported across the rolling structure 5321, the rolling structure 5321 is in contact with the sheet article D' for facilitating feeding the sheet article D'. The linking rod 5322 is connected to the rolling structure 5321 and the swinging rod 5331. The configurations and operating principles of the optical displacement sensing member 534 are identical to that shown in the first embodiment, and are not redundantly described herein.

Please refer to FIGS. 8A and 8B. When the sheet article D' is fed by the pick-up module 52 and transported across the thickness detecting module 53, the rolling structure 5321 is in contact with the sheet article D' and the sheet article D' is sustained against the rolling structure 5321, so that the rolling structure 5321 is moved from a first position P1 to a second position P2. Since the linking rod 5322 is connected with the rolling structure 5321, the linking rod 5322 is synchronously moved with the rolling structure 5321. The swinging rod 5331 may be swung with respect to the first end of the swinging rod 5331, which is fixed on the casing 50. That is, the first end of the swinging rod 5331 is served as a fulcrum. As the rolling structure 5321 is moved from the first position P1 to the second position P2, the shifting part 5332 connected to the second end of the swinging rod 5331 will be moved from a third position P3 to a fourth position P4. By detecting the displacement amount of the detecting surface 53321 of the shifting part 5332, the optical displacement sensing member 534 can acquire the thickness of the sheet article D'. After the sheet article D' is departed from the thickness detecting module 53, the sheet article D' is no longer sustained against the rolling structure 5321. Due to the elastic force offered by the resilient element 535, the shifting part 5332 is returned from the fourth position P4 to the third position P3, and the rolling structure 5321 is returned from the second position P2 to the first position P1. Meanwhile, the thickness detecting process is completed.

In this embodiment, the linking rod 5322 is arranged in the middle of the swinging rod 5331, and the shifting part 5332 is connected to the second end of the swinging rod 5331. As such, the displacement amount of the shifting part 5332 is twice as large as the displacement amount of the linking rod 5322. In other words, after the displacement amount from the third position P3 to the fourth position P4 is divided by 2, the actual displacement amount from the first position P1 to the second position P2 (i.e. the thickness of the sheet article D') is obtained.

From the above description, the automatic document feeder of the present invention is capable of detecting the thickness of the document by means of the optical displacement sensing member and other mechanical components. According to the thickness, the thickness detecting module can realize whether a double feeding or multi feeding problem occurs. The double feeding or multi feeding problem may be solved by further processing processes. Since the thickness detecting module of the present automatic document feeder utilizes the optical displacement sensing member to detect the thickness of the document, the thickness detecting module of the present automatic document feeder has simple configurations and reduced volume when compared with the prior art. In other words, the overall volume of the automatic document feeder of the present invention is reduced. More especially in the fourth embodiment, since the optical displacement sensing member is disposed beside the transfer channel rather than above the transfer channel, the overall volume of the automatic document feeder of the present invention is further reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An automatic document feeder for feeding a sheet article, said automatic document feeder comprising:

a transfer channel;

a pick-up module for feeding said sheet article into said transfer channel; and a thickness detecting module for detecting said sheet article that is fed into said transfer channel, wherein said thickness detecting module is disposed within a module housing, said thickness detecting module comprising:

a detecting member disposed in said transfer channel to be in contact with said sheet article, wherein when said sheet article is transported across said detecting member, said sheet article is sustained against said detecting member, so that said detecting member is moved from a first position to a second position, wherein said detecting member comprises:

a rolling structure in contact with said sheet article for facilitating feeding said sheet article when said sheet article is transported across said rolling structure; and a linking rod connected to said rolling structure and a swinging arm, wherein when said sheet article is sustained against said rolling structure and said rolling structure is moved from said first position to said second position, said linking rod and said rolling structure are synchronously moved and said swinging arm is swung from a third position to a fourth position in response to movement of said linking rod, so that a 2. The automatic document feeder according to claim 1 wherein said optical displacement sensing member comprises:
a circuit board;
a light source disposed on said circuit board for emitting light beams;
an optical assembly for guiding said light beams to be projected on said transmission member;
a sensor disposed on said circuit board for receiving said light beams reflected from said transmission member and generating corresponding image signals according to said reflected light beams, wherein a first image signal is obtained by said sensor when said transmission member is located in a third position, and a second image signal is obtained by said sensor when said transmission member is located in a fourth position; and
displacement amount of a detecting surface of said swinging arm is detectable by an optical displacement sensing member and a thickness of said sheet article is acquired;
a transmission member connected with said detecting member, wherein as said detecting member is moved from said first position to said second position, said transmission member is moved from said third position to said fourth position, wherein said transmission member comprises:
  a fixing shaft fixed on said module housing; and
  said swinging arm swung with respect to said module housing, and having said detecting surface; and
wherein said optical displacement sensing member is disposed beside said transmission member for detecting a displacement amount of said transmission member, thereby acquiring said thickness of said sheet article,
wherein said thickness detecting module further comprises a resilient element, an end of said resilient element is connected to said linking rod, and the other end of said resilient element is connected to said module housing, wherein after said sheet article is departed from said rolling structure and not sustained against said rolling structure, an elastic force provided by said resilient element allows said rolling structure to be returned from said second position to said first position.
a control unit disposed on said circuit board for calculating said displacement amount between said first position and said second position according to said first image signal and said second image signal.

3. The automatic document feeder according to claim 2 wherein said optical assembly comprises:
a first optical lens arranged in front of said light source for focusing said light beams emitted by said light source and projecting said focused light beams on said transmission member; and
a second optical lens for receiving said light beams reflected from said transmission member and focusing said light beams.

4. The automatic document feeder according to claim 3 wherein said optical assembly further comprises a reflective mirror set for changing the direction of said light beams, so that said light beams are projected on said transmission member.

5. The automatic document feeder according to claim 4 wherein said reflective minor set comprises a first reflective minor and a second reflective mirror, said light beams emitted by said light source pass through said first optical lens, are reflected from said first reflective minor and said second reflective mirror, and are projected on said surface of said detecting arm, wherein said light beams reflected from said transmission member pass through said second optical lens and is projected on said sensor to be received by said sensor.

6. The automatic document feeder according to claim 5 wherein said first optical lens and said second optical lens are convex lenses.

7. The automatic document feeder according to claim 5 wherein said first optical lens, said second optical lens, said first reflective mirror and said second reflective mirror of said optical assembly are integrally formed.

8. The automatic document feeder according to claim 2 wherein said light source is a light emitting diode (LED) or a laser diode.

9. The automatic document feeder according to claim 2 wherein said control unit is a digital signal processor (DSP).

* * * * *